(12) United States Patent
Hur et al.

(10) Patent No.: US 9,871,437 B2
(45) Date of Patent: Jan. 16, 2018

(54) FAULT CURRENT REDUCTION STRUCTURE OF MULTI-LEVEL CONVERTER AND APPARATUS USING THE FAULT CURRENT REDUCTION STRUCTURE

(71) Applicant: University-Industry Foundation(UIF), Seoul (KR)

(72) Inventors: Kyeon Hur, Seoul (KR); Hee Jin Kim, Seoul (KR); Sang Min Kim, Seoul (KR)

(73) Assignee: UNIVERSITY-INDUSTRY FOUNDATION(UIF) (KR)

( * ) Notice: Subject to any disclaimer, the term of this patent is extended or adjusted under 35 U.S.C. 154(b) by 3 days.

(21) Appl. No.: 14/795,921

(22) Filed: Jul. 10, 2015

(65) Prior Publication Data

US 2016/0013716 A1    Jan. 14, 2016

(30) Foreign Application Priority Data

Jul. 10, 2014   (KR) .................. 10-2014-0086812
Jul. 10, 2014   (KR) .................. 10-2014-0086813
Oct. 31, 2014   (KR) .................. 10-2014-0150335

(51) Int. Cl.
*H02M 1/32* (2007.01)
*H02H 7/122* (2006.01)
*H02M 7/483* (2007.01)

(52) U.S. Cl.
CPC ............. *H02M 1/32* (2013.01); *H02M 7/483* (2013.01); *H02M 2007/4835* (2013.01)

(58) Field of Classification Search
CPC ............. H02M 1/32; H02M 2001/325; H02M 2007/4835; H02M 2007/483; H02M 7/49;

(Continued)

(56) References Cited

U.S. PATENT DOCUMENTS 3,379,955 A * 4/1968 Koetsch .................. H02M 1/32
                                                        363/136
6,229,722 B1 * 5/2001 Ichikawa ................ H02M 7/10
                                                        363/71

(Continued)

FOREIGN PATENT DOCUMENTS

EP          2650999         10/2013
JP        2010512135         4/2010

(Continued)

OTHER PUBLICATIONS

Korean Notice of Allowance dated Aug. 3, 2015 issued by the KIPO for Korean Patent Application No. 10-2014-0086812.

(Continued)

*Primary Examiner* — Timothy J Dole
*Assistant Examiner* — Sisay G Tiku
(74) *Attorney, Agent, or Firm* — Onello & Mello, LLP

(57) ABSTRACT

Provided are a multi-level converter having more than one converter arm in which a plurality of sub-modules are connected in series, multi-level converter comprising, a first bypass circuit connected in parallel to at least one sub-module included in more than one converter arm on a first side and including a first switching device, a second bypass circuit connected in parallel to more than one converter arm on a second side and including a diode, a second switching device included in more than one converter arm and having a first end connected in series to at least one sub-module and a second end connected to a first end of first bypass circuit at a single node and a third switching device included in more than one converter arm and having a first end connected in series to at least one sub-module and a second end connected to a first end of second bypass circuit at a single node.

6 Claims, 23 Drawing Sheets

(58) Field of Classification Search
CPC .... H02H 7/122; H02H 7/1222; H02H 7/1225; H02H 7/1227
See application file for complete search history.

(56) References Cited

U.S. PATENT DOCUMENTS

| | | | |
|---|---|---|---|
| 8,817,440 | B2 | 8/2014 | Dommaschk et al. |
| 2008/0211449 | A1* | 9/2008 | Yamai .................. H02M 5/458 318/767 |
| 2009/0102436 | A1 | 4/2009 | Escobar Valderrama et al. |
| 2010/0066174 | A1 | 3/2010 | Dommaschk et al. |
| 2011/0122667 | A1* | 5/2011 | Mino .................. H02M 1/4208 363/125 |
| 2011/0235375 | A1 | 9/2011 | Dommaschk et al. |
| 2013/0063995 | A1* | 3/2013 | Norrga .................. H02M 1/32 363/125 |
| 2013/0088802 | A1 | 4/2013 | Berggren et al. |
| 2013/0121042 | A1* | 5/2013 | Gan .................. H02M 7/49 363/37 |
| 2013/0128636 | A1 | 5/2013 | Trainer et al. |
| 2013/0279211 | A1 | 10/2013 | Green et al. |
| 2013/0293985 | A1 | 11/2013 | Lescale |
| 2014/0049230 | A1 | 2/2014 | Weyh |
| 2014/0140104 | A1 | 5/2014 | Norrga et al. |
| 2014/0203632 | A1* | 7/2014 | Kouno .................. H02M 7/219 307/9.1 |
| 2014/0226374 | A1* | 8/2014 | Hafneer .................. H02M 1/32 363/35 |
| 2015/0116881 | A1 | 4/2015 | Burnett et al. |
| 2015/0214727 | A1* | 7/2015 | Chen .................. H02J 3/01 363/56.02 |
| 2015/0333660 | A1* | 11/2015 | Kim .................. H02M 7/483 363/123 |
| 2015/0357906 | A1* | 12/2015 | Jung .................. H02M 7/483 363/56.03 |
| 2016/0036314 | A1* | 2/2016 | Koyanagi .................. H02M 1/32 363/65 |
| 2016/0211762 | A1* | 7/2016 | Cheng .................. H02M 7/483 |

FOREIGN PATENT DOCUMENTS

| | | |
|---|---|---|
| JP | 2013169088 | 8/2013 |
| KR | 100163643 | 4/1999 |
| KR | 101389579 | 4/2014 |
| KR | 101456097 | 11/2014 |
| WO | 2013017145 | 2/2013 |
| WO | 2013127463 | 9/2013 |

OTHER PUBLICATIONS

Korean Notice of Allowance dated Aug. 1, 2015 issued by the KIPO for Korean Patent Application No. 10-2014-0086813.

* cited by examiner

[Fig. 1]
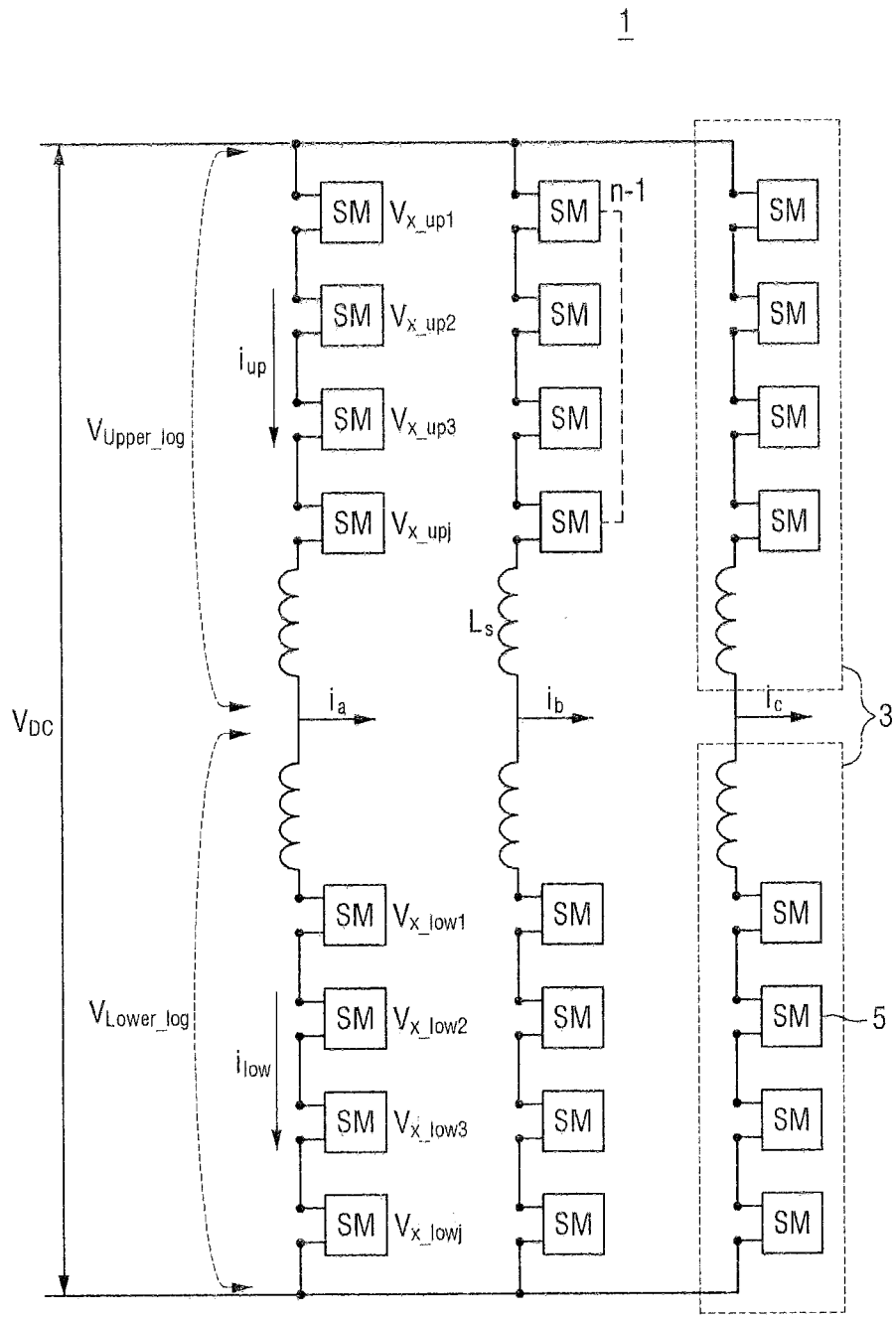

[Fig. 2]
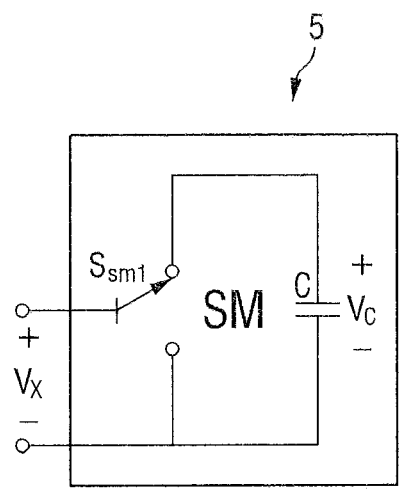
[Fig. 3]
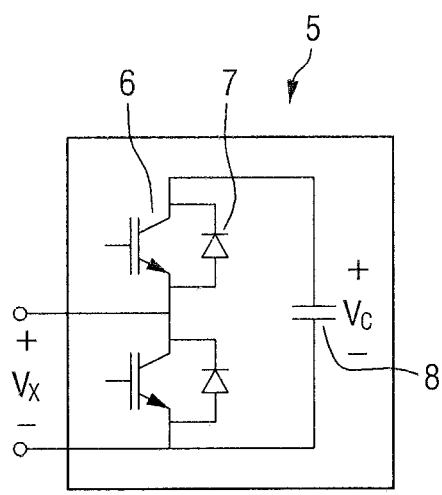

[Fig. 4]
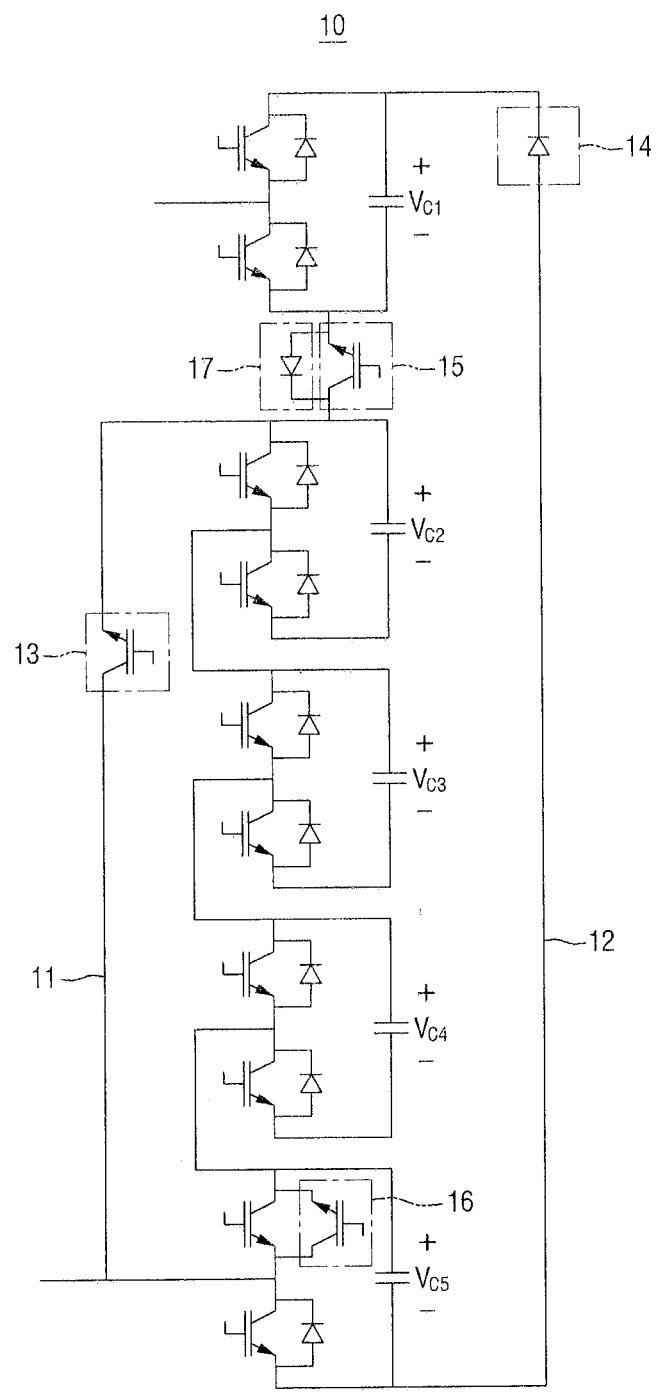

[Fig. 5]
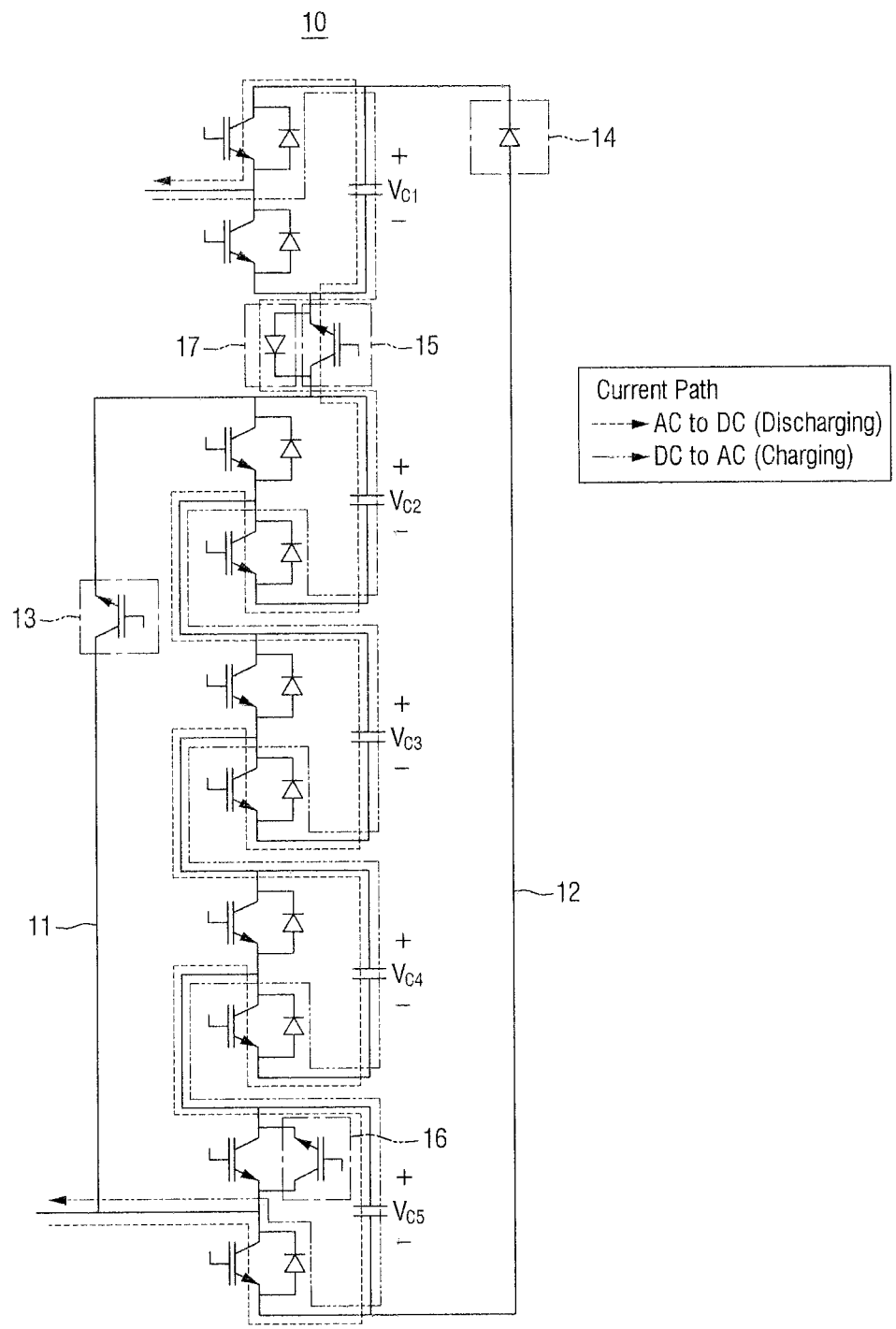

[Fig. 6]
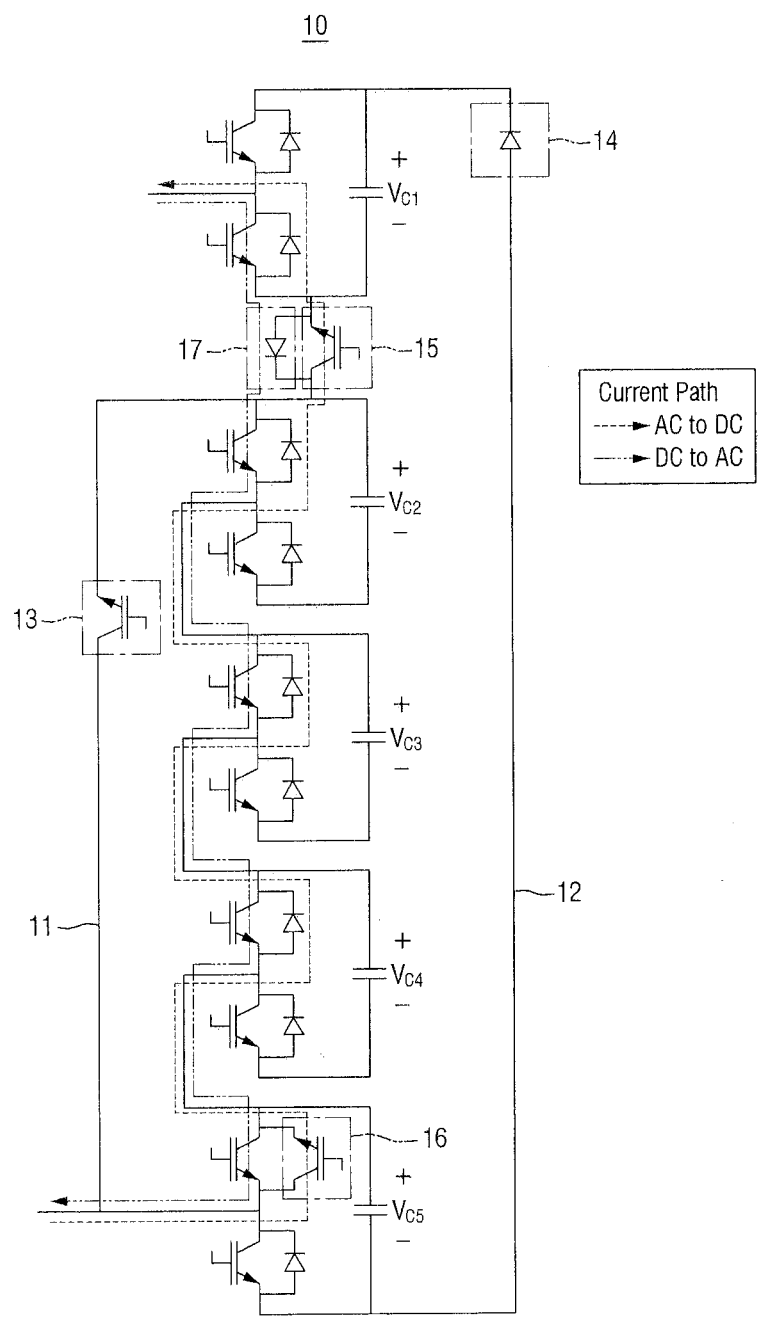

[Fig. 7]
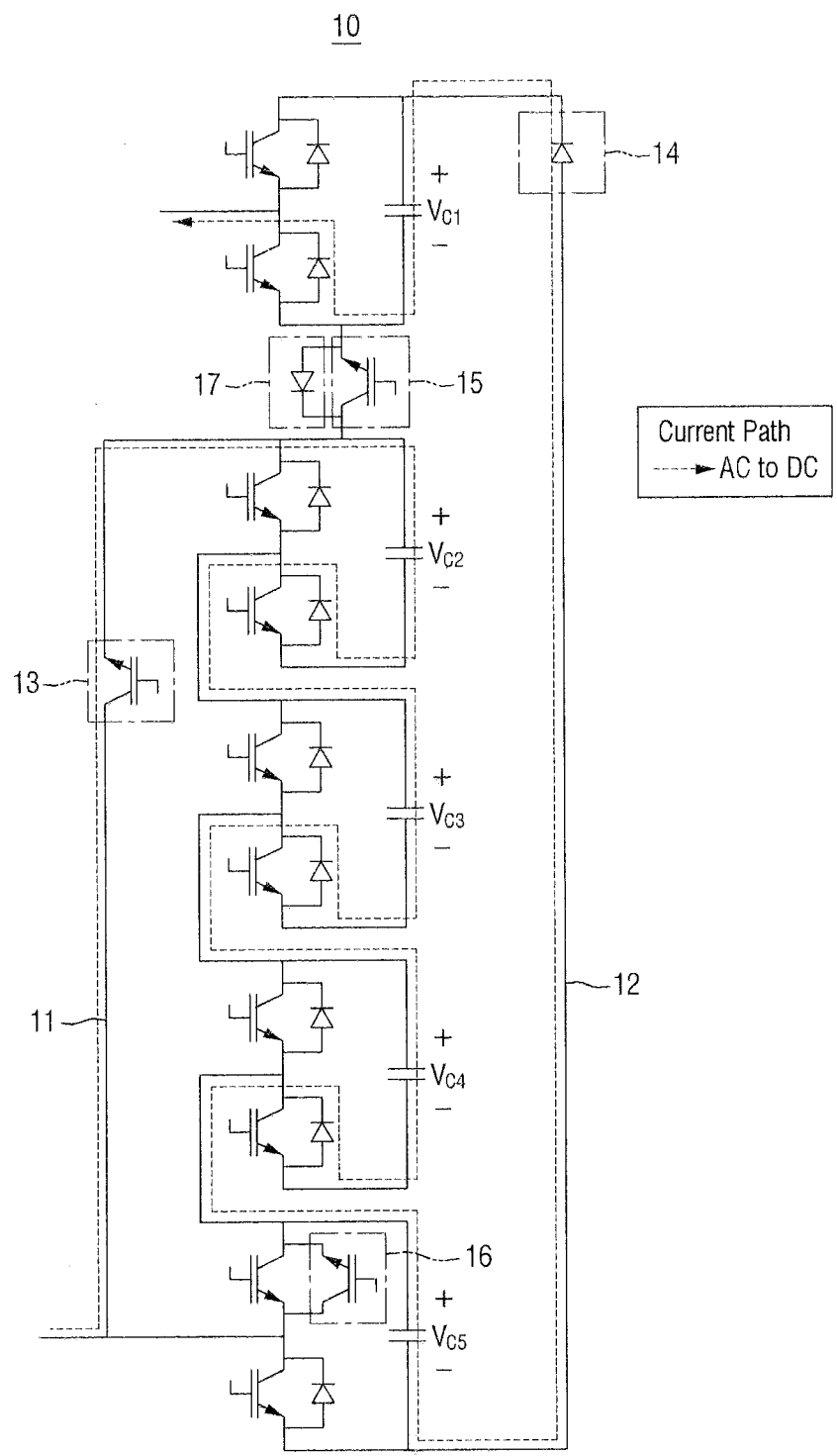

[Fig. 8]
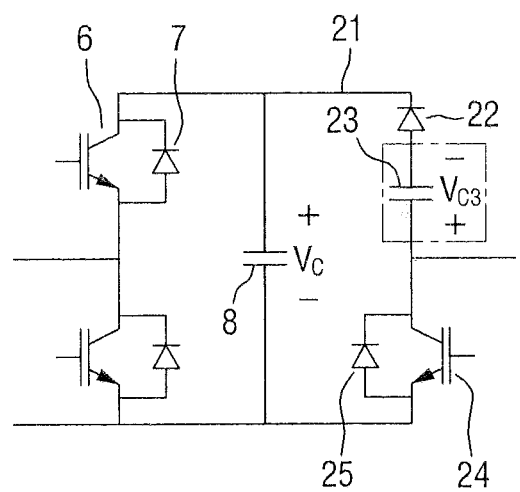
[Fig. 9]
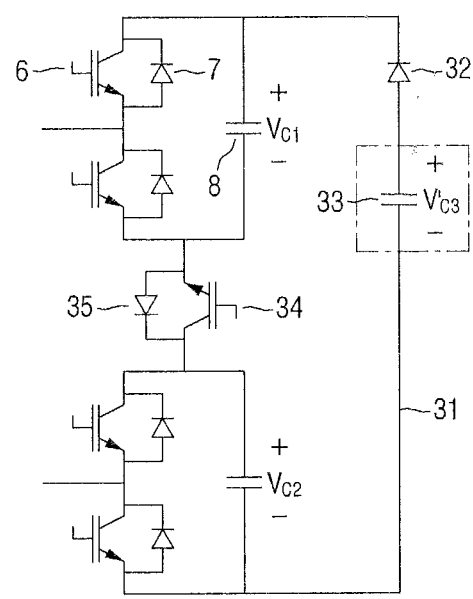

[Fig. 10]
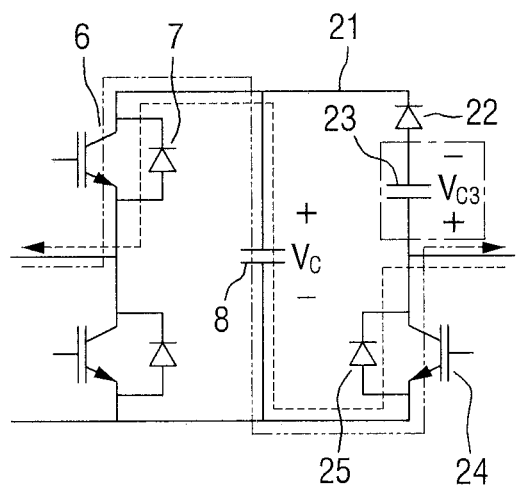

[Fig. 11]
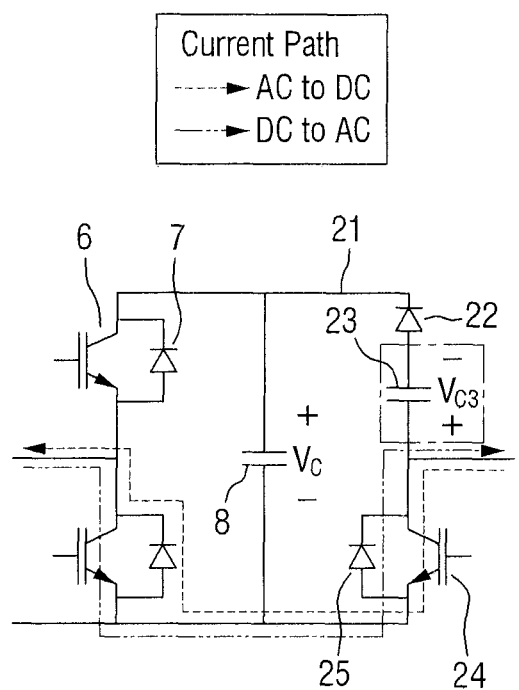

[Fig. 12]
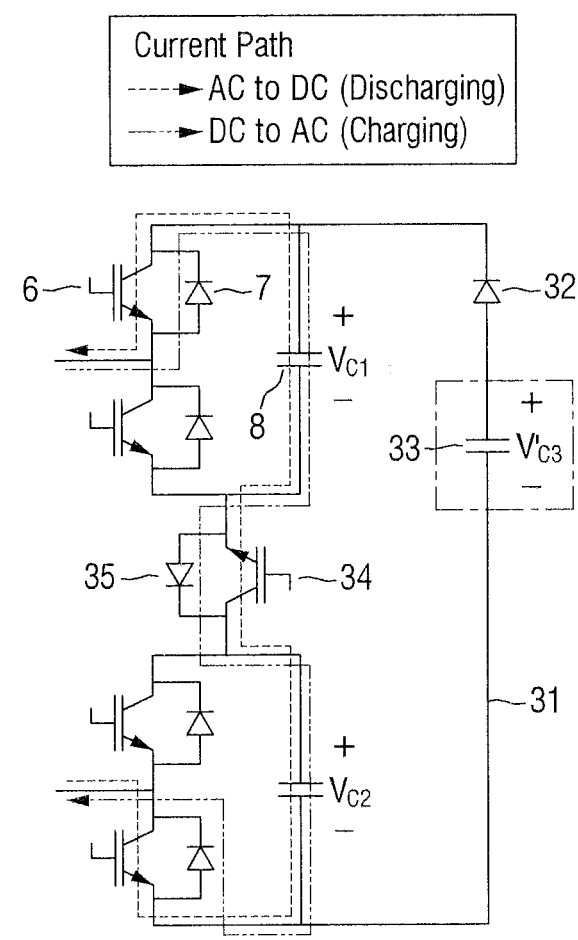

[Fig. 13]
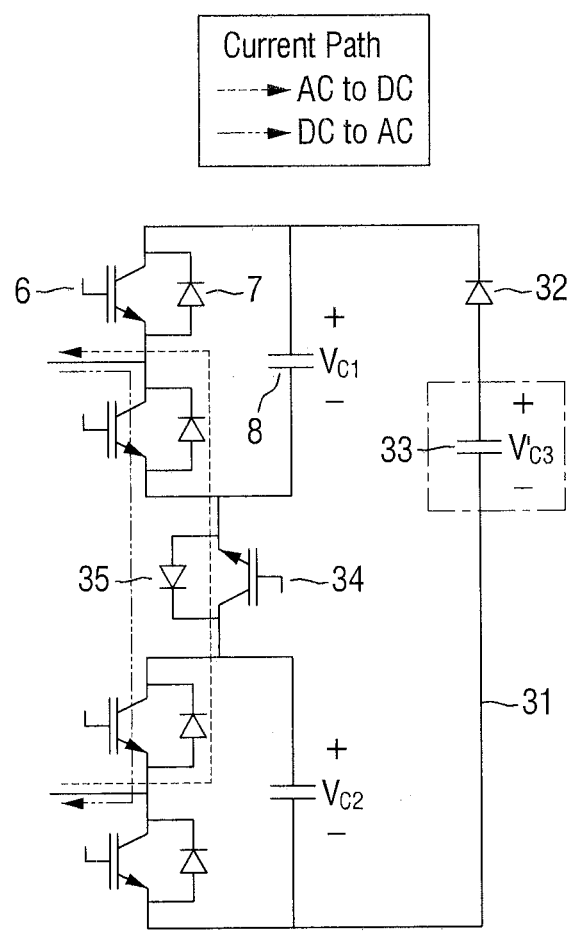

[Fig. 14]
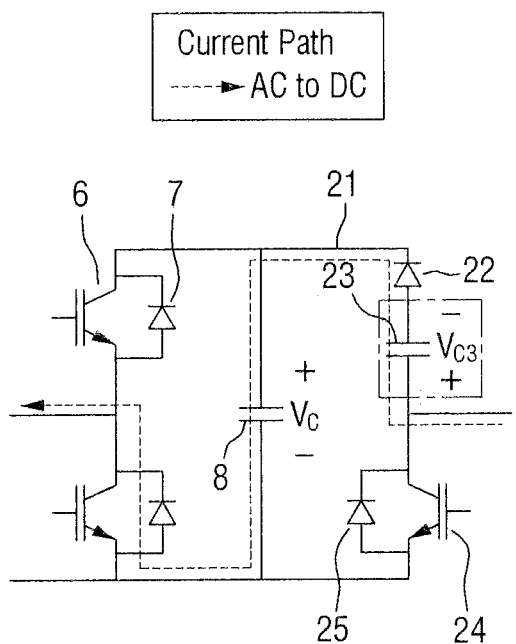

[Fig. 15]
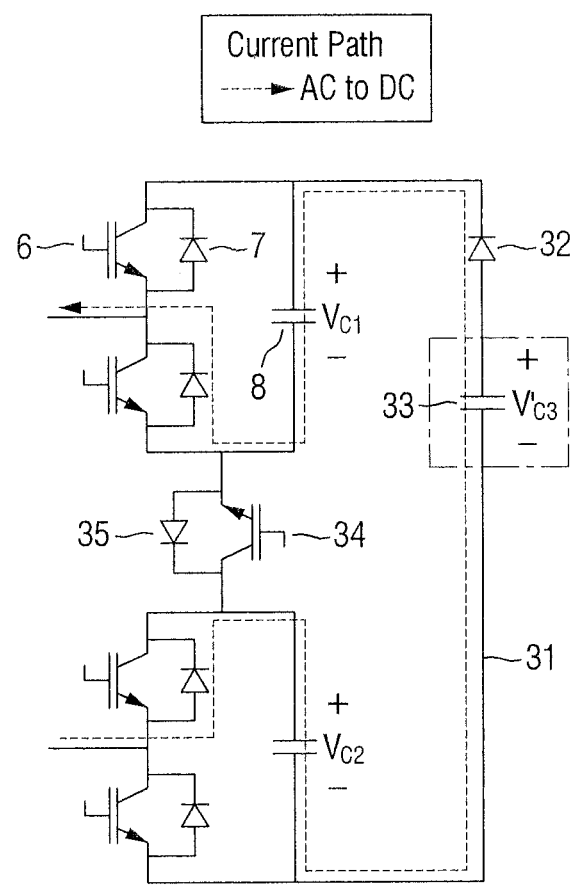

[Fig. 16]
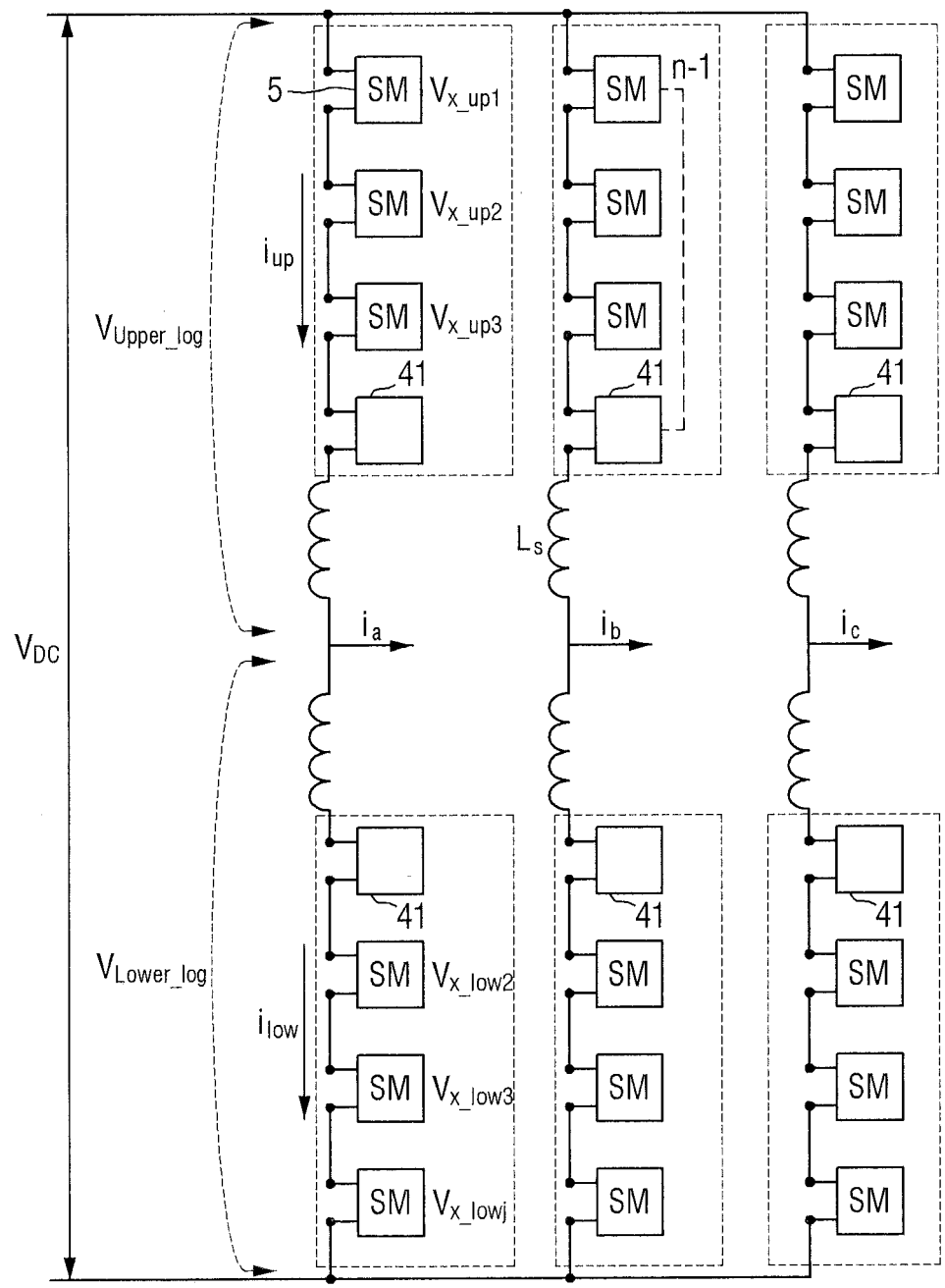

[Fig. 17]
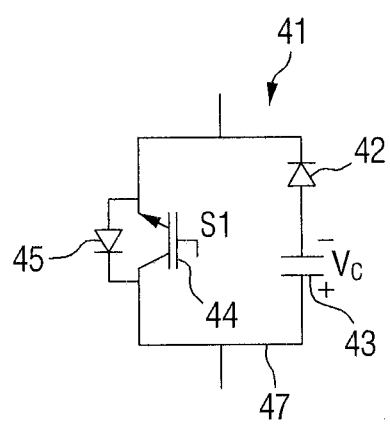

[Fig. 18]
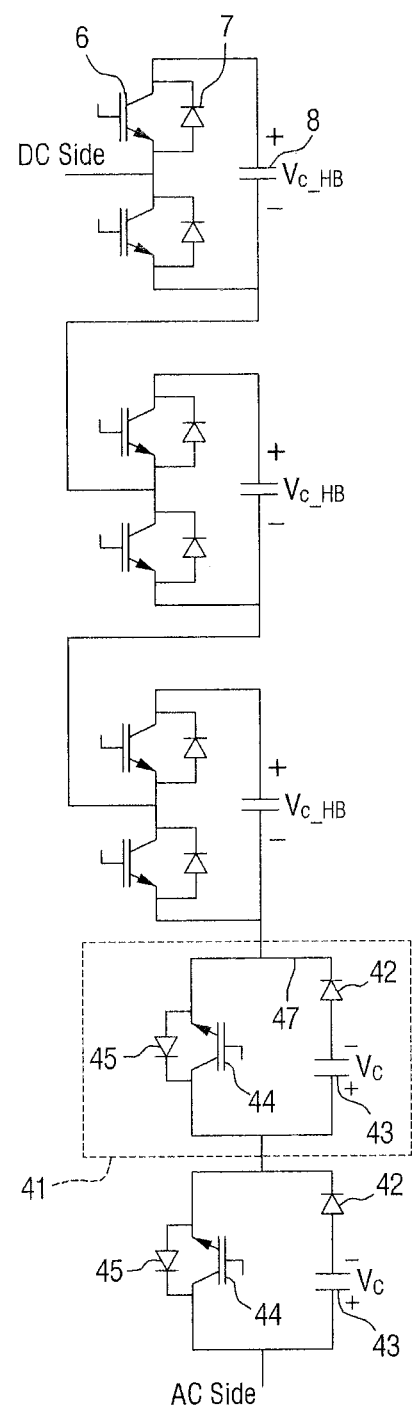

【Fig. 19】
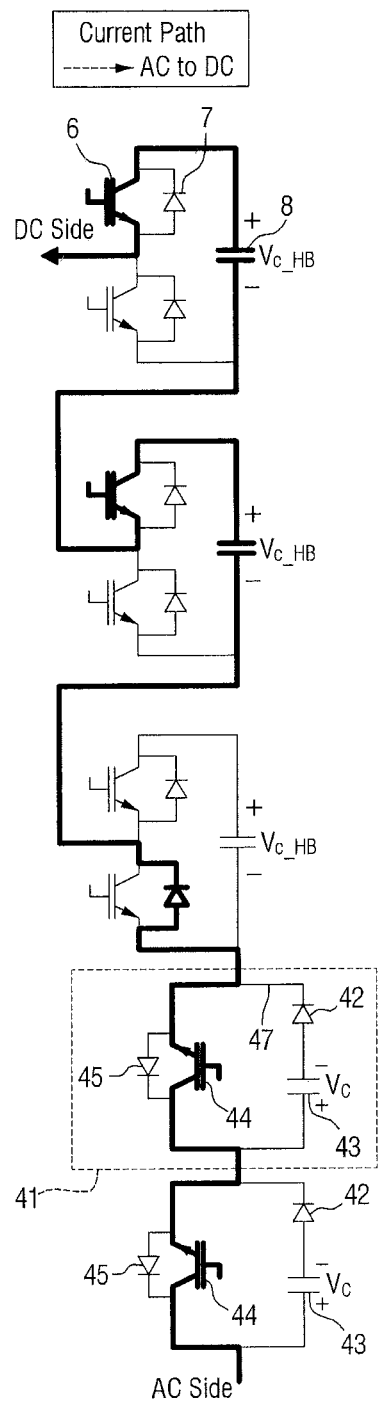

[Fig. 20]
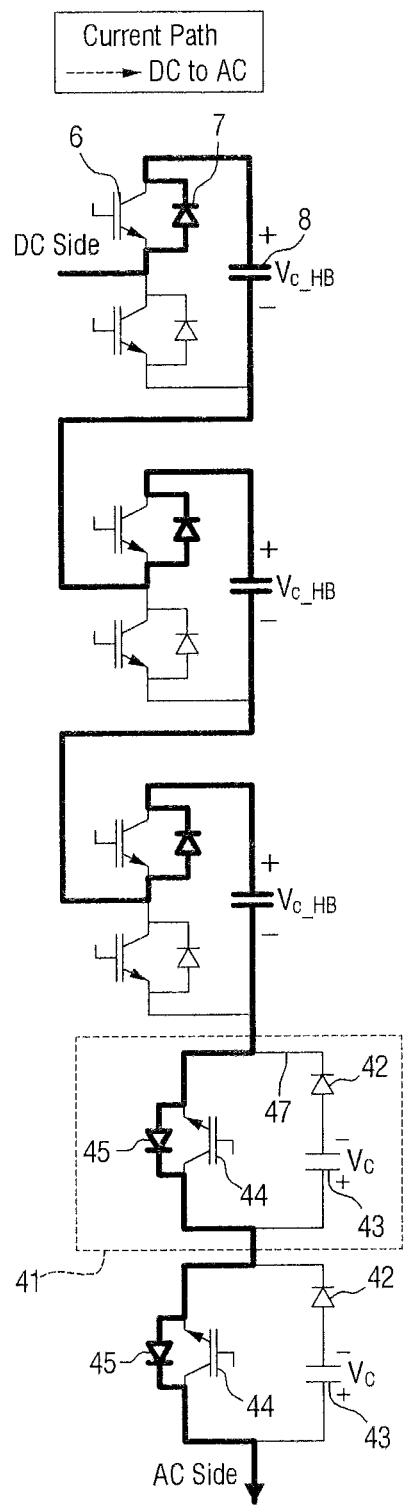

[Fig. 21]
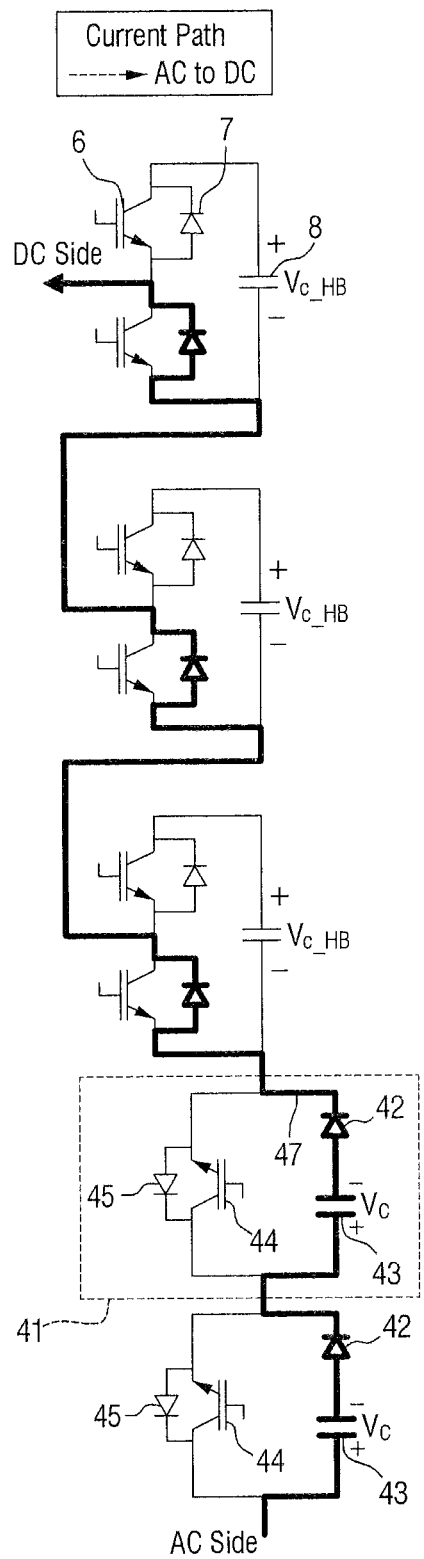

[Fig. 22]
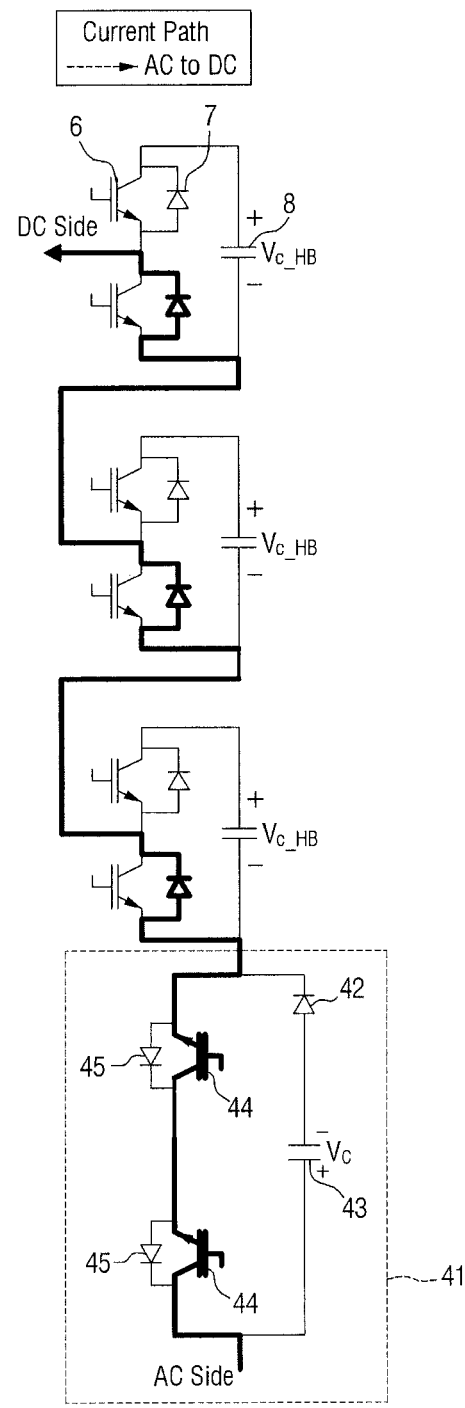

【Fig. 23】
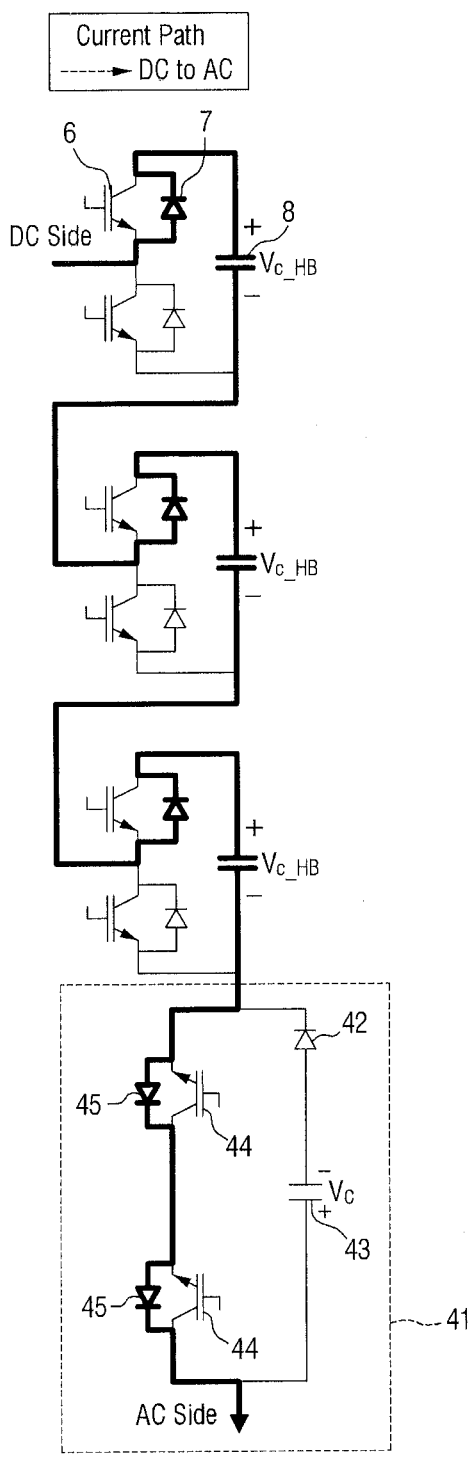

[Fig. 24]
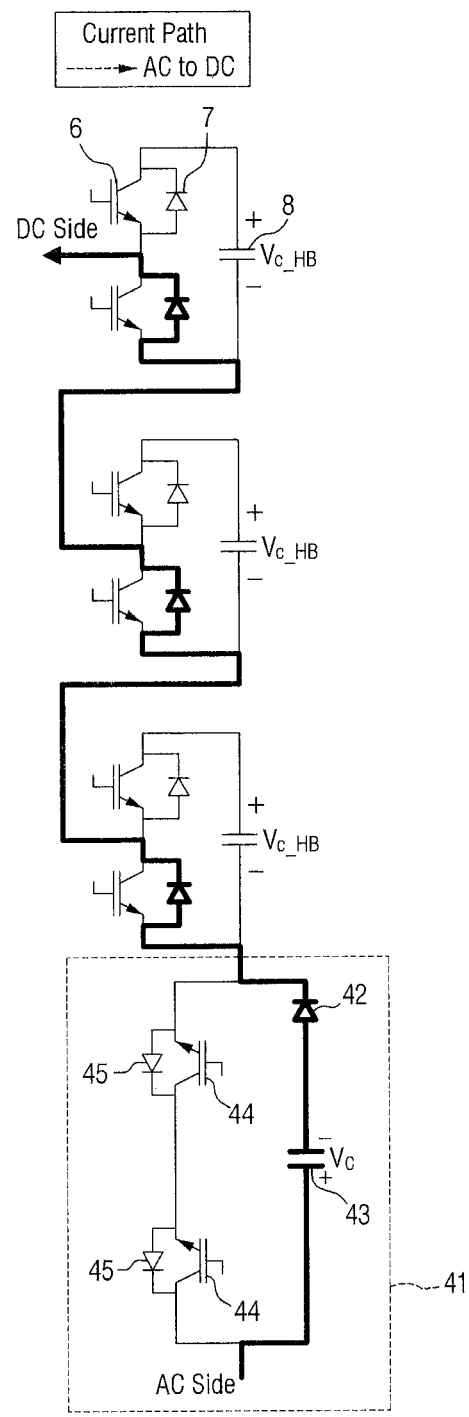

[Fig. 25]
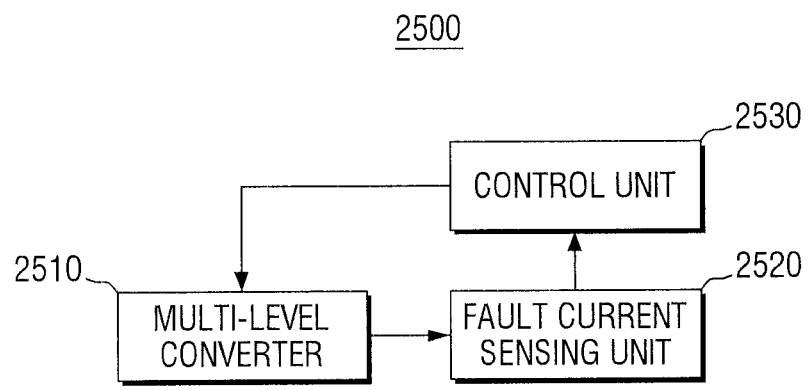

FAULT CURRENT REDUCTION STRUCTURE OF MULTI-LEVEL CONVERTER AND APPARATUS USING THE FAULT CURRENT REDUCTION STRUCTURE

This application claims priority to Korean Patent Application No. 10-2014-0086812 filed on Jul. 10, 2014, No. 10-2014-0086813 filed on Jul. 10, 2014, No. 10-2014-0150335 filed on Oct. 31, 2014 in the Korean Intellectual Property Office, the disclosure of which is incorporated herein by reference in its entirety.

BACKGROUND

1. Field of the Invention

The invention relates to a fault current reduction structure of a multi-level converter and an apparatus using the fault current reduction structure, and more particularly, to a fault current reduction structure of a multi-level converter, which is capable of reducing a fault current in the multi-level converter by blocking and bypassing the fault current generated in response to the occurrence of a direct current (DC) fault, and an apparatus using the fault current reduction structure.

2. Description of the Related Art

Conventional voltage-type converters generally have a considerable number of switching operations and require filters to generate sinusoidal waves. Accordingly, high-capacity converters that result in less distorted voltage waveforms and do not require the installation of filters have been required, and multi-level converters have been introduced. Systems using multi-level converters are efficient for use in fields that require low harmonic components and high power.

FIG. 1 is a diagram illustrating a typical multi-level converter. FIG. 2 is a diagram illustrating a switching operation performed by the multi-level converter of FIG. 1. FIG. 3 is a diagram illustrating the structure of sub-modules of the multi-level converter of FIG. 1.

Referring to FIGS. 1 to 3, a multi-level converter 1 may have three legs and six arms 3, and each of the arms 3 may include n sub-modules (SMs) 5 (where n is a natural number). Each of the arms 3 is illustrated in FIG. 1 as including four SMs 5. Each of the SMs 5 may include a pair of insulated gate bipolar transistors (IGBTs) 6, a pair of diodes 7, and a capacitor 8. Each of the SMs 5 may be switched on or off according to the turning on or off of the IGBTs 6 thereof. For example, the charging and discharging of SMs 5 that are turned on may be performed according to a direction of an arm current. For example, in response to the arm current having a positive level, an SM 5 having a lowest voltage may be selected and discharged. On the other hand, in response to the arm current having a negative level, an SM 5 having a highest voltage may be selected and discharged. Accordingly, the number of switching operations for each of the SMs 5 may be reduced.

Research has been widely conducted on measures to deal with an alternating current (AC) fault in the multi-level converter 1, but not so much on measures to address a direct current (DC) fault. In response to the occurrence of a DC fault in the multi-level converter 1, the IGBTs 6, the diodes 7 and the capacitor 8 of each of the SMs 5 may be damaged by a high current. Also, power transmission lines and cables may be damaged by a fault current. Also, the capacitor 8 of each of the SMs 5 may be completely discharged, and may take a while to be rebooted.

SUMMARY

Exemplary embodiments of the invention provide a fault current reduction structure of a multi-level converter, which is capable of reducing a fault current in the multi-level converter by blocking and bypassing a fault current generated in response to the occurrence of a direct current (DC) fault, and an apparatus using the fault current reduction structure.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a multi-level converter has more than one converter arm in which a plurality of sub-modules are connected in series and includes: a first bypass circuit connected in parallel to at least one sub-module included in the more than one converter arm on a first side and including a first switching device; a second bypass circuit connected in parallel to the more than one converter arm on a second side and including a diode; a second switching device included in the more than one converter arm and having a first end connected in series to the at least one sub-module and a second end connected to a first end of the first bypass circuit at a single node; and a third switching device included in the more than one converter arm and having a first end connected in series to the at least one sub-module and a second end connected to a first end of the second bypass circuit at a single node.

In response to the detection of a fault current, the first switching device may be short-circuited and the second switching device and the third switching device may be opened.

According to an exemplary embodiment of the invention, a multi-level converter has more than one converter arm in which a plurality of sub-modules are connected in series, wherein each of the sub-modules includes a bypass circuit, which is connected in parallel to a corresponding sub-module, and the bypass circuit includes a diode, which is connected such that a forward direction thereof can be aligned with a direction of the flow of a fault current, and a capacitor, which is connected in series to the diode.

The bypass circuit may also include a switching device, which is connected in series to the capacitor, and a diode, which is connected in parallel to the switching device.

In response to the detection of a fault current, the switching device of the bypass circuit may be opened.

The more than one converter arm may include a switching device, which is connected in series between the sub-modules, and a diode, which is connected in parallel to the switching device.

In response to the detection of a fault current, the switching device of the more than one converter arm may be opened.

According to an exemplary embodiment of the invention, a multi-level converter has more than one converter arm in which a plurality of sub-modules are connected in series and includes a fault current reduction module connected in series to the more than one converter arm, wherein the fault current reduction module includes a bypass circuit, which is connected in series to the sub-modules, and a switching device, which is connected in parallel to the bypass circuit, and the bypass circuit includes a capacitor and a diode, which is connected in series to the capacitor.

The diode may be connected such that a forward direction thereof can be aligned with a direction of the flow of a fault current.

The fault current reduction module may also include a diode, which is connected in parallel to the switching device.

In response to the detection of a fault current, the switching device may be opened.

According to an exemplary embodiment of the invention, a fault current reduction apparatus of a multi-level converter, includes: a fault current sensing unit sensing a fault current; the multi-level converter including more than one converter arm in which a plurality of sub-modules are connected in series and further including a first bypass circuit, which is connected in parallel to at least one sub-module included in the more than one converter arm on a first side and includes a first switching device, a second bypass circuit, which is connected in parallel to the more than one converter arm on a second side and includes a diode, a second switching device, which is included in the more than one converter arm and has a first end connected in series to the at least one sub-module and a second end connected to a first end of the first bypass circuit at a single node, and a third switching device, which is included in the more than one converter arm and having a first end connected in series to the at least one sub-module and a second end connected to a first end of the second bypass circuit at a single node; and a control unit short-circuiting the first switching device upon the detection of the fault current and opening the second switching device and the third switching device.

The first, second and third switching devices may be short-circuited or opened according to a control signal applied by the control unit.

According to an exemplary embodiment of the invention, a fault current reduction apparatus of a multi-level converter, includes: a fault current sensing unit sensing a fault current; the multi-level converter including more than one converter arm in which a plurality of sub-modules are connected in series, wherein each of the sub-modules includes a bypass circuit, which is connected in parallel to a corresponding sub-module, and the bypass circuit includes a diode, which is connected such that a forward direction thereof can be aligned with a direction of the flow of a fault current, and a capacitor, which is connected in series to the diode; and a control unit controlling the fault current to flow to the bypass circuit in response to the detection of the fault current.

The bypass circuit further may include a switching device, which is connected in series to the capacitor, and the control unit may open the switching device in response to the detection of the fault current.

According to an exemplary embodiment of the invention, a fault current reduction apparatus of a multi-level converter, includes: a fault current sensing unit sensing a fault current; the multi-level converter including more than one converter arm in which a plurality of sub-modules are connected in series and further including a fault current reduction module connected in series to the more than one converter arm, wherein the fault current reduction module includes a bypass circuit, which is connected in series to the sub-modules, and a switching device, which is connected in parallel to the bypass circuit, and the bypass circuit includes a capacitor and a diode, which is connected in series to the capacitor; and a control unit controlling the fault current to flow to the bypass circuit in response to the detection of the fault current.

The control unit may open the switching device in response to the detection of the fault current.

According to the exemplary embodiments, it is possible to reduce a fault current in a multi-level converter by bypassing or blocking the fault current.

In addition, since a fault current can be reduced, it is possible to prevent damage to IGBTs, diodes and capacitors. Also, since the discharge of the voltage of each capacitor can be prevented, it is possible to quickly reboot a multi-level converter after the removal of a fault current.

Other features and exemplary embodiments will be apparent from the following detailed description, the drawings, and the claims.

BRIEF DESCRIPTION OF THE DRAWINGS

FIG. 1 is a diagram illustrating a typical multi-level converter.

FIG. 2 is a diagram illustrating a switching operation of the modular multi-level converter of FIG. 1.

FIG. 3 is a diagram illustrating the structure of sub-modules (SMs) of the modular multi-level converter of FIG. 1.

FIG. 4 is a diagram illustrating a multi-level converter arm according to an exemplary embodiment of the invention.

FIGS. 5 and 6 are diagrams illustrating the flow of a normal current in a fault current reduction structure of the multi-level converter of FIG. 4.

FIG. 7 is a diagram illustrating the flow of a fault current in the fault current reduction structure of the multi-level converter arm of FIG. 4.

FIG. 8 is a diagram illustrating a SM of multi-level converter according to another exemplary embodiment of the invention.

FIG. 9 is a diagram illustrating a part of multi-level converter according to another exemplary embodiment of the invention.

FIGS. 10 and 11 are diagrams illustrating the flow of a normal current in the SM of multi-level converter of FIG. 8.

FIGS. 12 and 13 are diagrams illustrating the flow of a normal current in the part of multi-level converter of FIG. 9.

FIG. 14 is a diagram illustrating the flow of a fault current in the SM of multi-level converter of FIG. 8.

FIG. 15 is a diagram illustrating the flow of a fault current in the part of multi-level converter of FIG. 9.

FIG. 16 is a diagram illustrating a modular multi-level converter according to an exemplary embodiment of the invention.

FIG. 17 is a diagram illustrating a fault current reduction module according to an exemplary embodiment of the invention.

FIG. 18 is a diagram illustrating a converter arm in which a plurality of fault current reduction modules according to the exemplary embodiment of FIG. 17 are connected in series.

FIGS. 19 and 20 are diagrams illustrating the flow of a normal current in a modular multi-level converter having a plurality of fault current reduction modules installed in each converter arm thereof.

FIG. 21 is a diagram illustrating the flow of a fault current in a modular multi-level converter having a plurality of fault current reduction modules installed in each converter arm thereof.

FIG. 22 is a diagram illustrating a fault current reduction structure according to another exemplary embodiment of the invention.

FIG. 23 is a diagram illustrating the flow of a current from a direct current (DC) side to an alternating current (AC) side in a fault current reduction module according to the exemplary embodiment of FIG. 22.

FIG. 24 is a diagram illustrating the flow of a current in a fault current reduction module according to the exemplary embodiment of FIG. 22 upon the generation of a fault current.

FIG. 25 is a block diagram illustrating a fault current reduction apparatus of a multi-level converter, according to an exemplary embodiment of the invention.

DETAILED DESCRIPTION OF THE EMBODIMENTS

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. In the drawings, the thickness of layers and regions are exaggerated for clarity.

The terminology used herein is for the purpose of describing particular embodiments only and is not intended to be limiting of the invention. It will be understood that the terms "comprises" and/or "made of," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component, or a first section discussed below could be termed a second element, a second component, or a second section without departing from the teachings of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

FIG. 4 is a diagram illustrating a multi-level converter arm according to an exemplary embodiment of the invention.

Referring to FIG. 4, a multi-level converter arm 10 includes more than one converter arm in which a plurality of sub-modules (SMs) are connected in series.

More specifically, the multi-level converter arm 10 includes first and second bypass circuits 11 and 12, which provide a bypass path for a fault current that may be generated in each converter arm.

As illustrated in FIG. 4, the first bypass circuit 11 may be connected in parallel to at least one SM. The first bypass circuit 11 includes a first switching device 13.

The second bypass circuit 12 is connected in parallel to a converter arm on the opposite side of the first bypass circuit 11. The second bypass circuit 12 includes a diode.

The multi-level converter 10 arm may also include a second switching device 15 and a third switching device 16, which are connected to the SMs to block a fault current.

More specifically, the second switching device 15 may be included in a converter arm and may have a first end connected in series to the SMs and a second end connected to the same node as the second bypass circuit 12.

The first, second and third switching devices 13, 15 and 16 may be insulated gate bipolar transistors (IGBTs), but the invention is not limited thereto. That is, the first, second and third switching devices 13, 15 and 16 may be switching devices other than IGBTs. For example, the second and third switching devices 15 and 16 may be fast switches.

Referring to FIG. 4, a bypass path for a fault current may be provided by adding the first switching device 13 and a diode 14, and a fault current flowing in the multi-level converter arm 10 may be blocked by inserting the second and third switching devices 15 and 16. For example, in a case when a normal current flows, the first switching device 13 may be turned off, and the second and third switching devices 15 and 16 may be turned on. Accordingly, a current path may be formed along each of the SMs. To form the current path, a diode 17 may be provided to be connected in parallel to the second switching device 15. In a case when a fault current flows, the first switching device 13 may be turned on, and the second and third switching devices 15 and 16 may be turned off. Accordingly, a current does not flow through the SMs, and a current path is formed along the first switching device 13 and the diode 14. Since the second and third switching devices 15 and 16 are turned off to block the fault current, any potential difference may be eliminated by a capacitor of each of the SMs, and as a result, the fault current may converge to zero.

A current path in a multi-level converter arm in response to a fault current being generated will hereinafter be described.

FIGS. 5 and 6 are diagrams illustrating the flow of a normal current in the multi-level converter arm of FIG. 4. FIG. 7 is a diagram illustrating the flow of a fault current in the multi-level converter arm of FIG. 4.

Referring to FIGS. 5 and 6, in a case when a normal current flows, the first switching device 13 is turned off, and the second and third switching devices 15 and 16 are turned on. Accordingly, a current does not flow through the first switching device 13, but flows through the second and third switching devices 15 and 16.

As illustrated in FIG. 5, in response to a current flowing through the capacitor of each of the SMs, a charging or discharging operation may be performed. During a charging operation, a current flows from a direct current (DC) side to an alternating current (AC) side, and a current path is formed passing through the diode 17, which is connected in parallel to the second switching device 15. During a discharging operation, a current flows from the AC side to the DC side, and a current path is formed passing through the second switching device 15.

As illustrated in FIG. 6, a current may flow without passing through the capacitor of each of the SMs. In response to a current flowing from the DC side to the AC side, a current path is formed passing through the diode 17, which is connected in parallel to the second switching device 15. In response to a current flowing from the AC side to the DC side, a current path is formed sequentially passing through the third switching device 16 and the second switching device 15.

Referring to FIG. 7, in a case when a fault current flows, the first switching device 13 is turned on, and the second and third switching devices 15 and 16 are turned off. Accordingly, a current flows through the first switching device 13 and the diode 14 included in the first bypass circuit 11, but not through the second and third switching devices 15 and 16. That is, the first switching device 13 is turned on so as to secure a bypass path for the fault current, and the second and third switching devices 15 and 16 are turned off so as for the fault current to flow to the first bypass circuit 11, including the first switching device 13 and the diode 14, and to the second bypass circuit 12. A potential difference between the AC side and the DC side may be eliminated by the capacitor of each of the SMs, and the fault current may be reduced to zero. For example, referring to FIG. 7, the fault current may flow passing through the capacitor of each of the SMs, and any potential difference may be reduced by voltages $V_{C1}$, $V_{C2}$, $V_{C3}$, $V_{C4}$ and $V_{C5}$ of the capacitors of the SMs and may thus eventually converge to zero. Also, since the discharge of the voltages $V_{C1}$, $V_{C2}$, $V_{C3}$, $V_{C4}$ and $V_{C5}$ can be prevented, the multi-level converter arm 10 may be quickly rebooted after the removal of a fault current.

FIG. 8 is a diagram illustrating a SM (sub-module) of multi-level converter according to another exemplary embodiment of the invention.

Referring to FIG. 8, a SM of multi-level converter 20 includes more than one converter arm in which a plurality of SMs are connected in series. Each of the SMs may include a pair of switching devices 6, a pair of diodes 7 and a capacitor 8.

More specifically, the SM of multi-level converter 20 includes a bypass circuit 21, which is connected in parallel to the SMs and provides a bypass path, a diode 22, which is provided in the bypass circuit 21 to bypass a fault current, and a capacitor 23, which is installed in the bypass circuit 21 for storing the fault current and is connected in series to the diode 22.

The diode 22 installed in the bypass circuit 21 is connected such that its forward direction is aligned with a direction of the flow of a fault current. Due to the diode 22, the capacitor 23 is charged with a fault current. Accordingly, a potential difference between an AC side and a DC side may be reduced, and as a result, a fault current may be reduced. Due to the capacitor 23, the fault current may converge to zero.

The SM of multi-level converter 20 may also include a switching device 24, which is connected in series to the capacitor 23, and a diode 25, which is connected in parallel to the switching device 24.

For example, in a case when a normal current flows, the switching device 24 is turned on, and as a result, a current path is formed along each of the SMs. In a case when a fault current flows, the switching device 24 is turned off, and as a result, a current path is formed, but not along the switching devices 6 of each of the SMs.

The switching devices 6 of each of the SMs and the switching device 24 may be IGBTs, but the invention is not limited thereto. That is, the switching devices 6 of each of the SMs and the switching device 24 may be switching devices other than IGBTs. For example, the switching device 14 may be a fast switch.

The diode 22 installed in the bypass circuit 21 may allow a current to flow in an opposite direction to the diodes 7 of each of the SMs.

Accordingly, due to the diode 22 installed in the bypass circuit 11, a fault current may flow passing through the capacitor 8 of each of the SMs, instead of flowing to the diodes 7. Thus, a fault current may flow through only one of the diodes 7 of each of the SMs, rather than through the switching devices 6 of each of the SMs. FIG. 9 is a diagram illustrating a part of multi-level converter according to another exemplary embodiment of the invention.

Referring to FIG. 9, a part of multi-level converter 30 includes more than one converter arm in which a plurality of SMs are connected in series.

Each of the SMs may include a pair of switching devices 6, a pair of diodes 7 and a capacitor 8. More specifically, the part of multi-level converter 30 includes a bypass circuit 31, which is connected in parallel to the SMs and provides a bypass path for a fault current, a diode 32, which is provided in the bypass circuit 31 to bypass the fault current, and a capacitor 33, which is installed in the bypass circuit 31 for storing the fault current and is connected in series to the diode 32.

The diode 32 installed in the bypass circuit 31 provides a bypass path for a fault current so that the capacitor 22 can be charged with a fault current. Accordingly, a potential difference between an AC side and a DC side may be reduced, and as a result, a fault current may be reduced.

Due to the capacitor 33, a fault current may converge to zero. The part of multi-level converter 30 has the same structure as the SM of multi-level converter 20 of FIG. 8 except that the part of multi-level converter 30 has half-bridge connections between the elements thereof, whereas the multi-level converter arm 20 has full-bridge connections between the elements thereof.

The part of multi-level converter 30 may also include a switching device 34, which is connected between the SMs to block a fault current, and a diode 35, which is connected in parallel to the switching device 34.

More specifically, the switching device 34 is disposed between the SMs and is connected in series to the SMs, and the diode 35 is connected in parallel to the switching device 34.

In a case when a normal current flows, the switching device 34 is turned on, and accordingly, a current path is formed along each of the SMs.

In a case when a fault current flows, the switching device 34 is turned off, and accordingly, a current path is formed, but not along the switching devices 6 of each of the SMs. The switching devices 6 of each of the SMs and the switching device 34 may be IGBTs, but the invention is not limited thereto. That is, the switching devices 6 of each of the SMs and the switching device 34 may be switching devices other than IGBTs. For example, the switching device 34 may be a fast switch.

The diode 32 installed in the bypass circuit 31 and the diode 34 disposed between the SMs may allow a current to flow in an opposite direction to the diodes 7 of each of the SMs.

Accordingly, due to the diode 32 installed in the bypass circuit 31, a fault current may flow passing through the capacitor 8 of each of the SMs, instead of flowing to the diode 34 between the SMs.

Thus, a fault current may flow through only one of the diodes 7 of each of the SMs, rather than through the switching devices 6 of each of the SMs.

A current path in a SM of multi-level converter in a case when a normal current flows in the multi-level converter will hereinafter be described.

FIGS. 10 and 11 are diagrams illustrating the flow of a normal current in the SM of multi-level converter of FIG. 8. FIGS. 12 and 13 are diagrams illustrating the flow of a normal current in the part of multi-level converter of FIG. 9.

Referring to FIGS. 10 and 11, in a case when a normal current flows, the switching device 24 is turned on. Accordingly, a current does not flow through the diode 22 and the capacitor 23 of the bypass circuit 21, but flows through the SMs.

As illustrated in FIG. 10, in response to a current flowing through the capacitor 8 of each of the SMs, a charging or discharging operation may be performed. During a charging operation, a current flows from a DC side to an AC side, and a current path is formed passing through Diode 7.

During a discharging operation, a current flows from the AC side to the DC side, and a current path is formed passing through the switching device 6.

As illustrated in FIG. 11, a current may flow without passing through the capacitor 8. In response to a current flowing from the DC side to the AC side, a current path is formed passing through a lower switching device 6 of each of the SMs. In response to a current flowing from the AC side to the DC side, a current path is formed passing through a diode 7 connected in parallel to the lower switching device 6.

Referring to FIGS. 12 and 13, in a case when a normal current flows, the switching device 24 is turned on. Accordingly, a current does not flow through the diode 32 and the capacitor 33 of the bypass circuit 31, but flows through the SMs.

As illustrated in FIG. 12, in response to a current flowing through the capacitor 33, a charging or discharging operation may be performed. During a charging operation, a current flows from a DC side to an AC side, and a current path is formed passing through the diode 35, which is connected in parallel to the switching device 34, which is added between the SMs. During a discharging operation, a current flows from the AC side to the DC side, and a current path is formed passing through the switching device 34 between the SMs.

As illustrated in FIG. 13, a current may flow without passing through the capacitor 8 of each of the SMs. In response to a current flowing from the DC side to the AC side, a current path is formed passing through a lower switching device 6 of each of the SMs. In response to a current flowing from the AC side to the DC side, a current path is formed passing through a diode 7 connected in parallel to an upper switching device 6 of each of the SMs. That is, in a case when a current flows from the DC side to the AC side, a current path is formed sequentially passing through the lower switching device 6 of an upper SM, a diode 7 between the upper SM and a lower SM, and an upper switching device 6 of the lower SM. On the other hand, in a case when a current flows from the DC side to the AC side, a current path is formed sequentially passing through an upper diode 7 of the lower SM, a switching device 34 between the lower SM and the upper SM and a lower diode 7 of the upper SM.

A current path in a multi-level converter in a case when a fault current flows in the multi-level converter will hereinafter be described.

FIG. 14 is a diagram illustrating the flow of a fault current in the SM of multi-level converter of FIG. 8. FIG. 15 is a diagram illustrating the flow of a fault current in the part of multi-level converter of FIG. 9.

Referring to FIG. 14, in a case when a fault current flows, the switching device 24 is turned off. Accordingly, a current flows through the diode 22 of the bypass circuit 21, but not through the switching device 24 and the diode 25 connected in parallel to the switching device 24.

That is, since the switching device 24 is turned off, a bypass path to the bypass circuit 21 is secured for a fault current, and a fault current may be allowed to flow to the diode 22 and the capacitor 23. A potential difference between an AC side and a DC side may be eliminated not only by the capacitor 8 of each of the SMs, but also by the capacitor 23 of the bypass circuit 21. Accordingly, a fault current may be reduced to zero.

For example, a fault current may flow through the capacitor 8 of each of the SMs and the capacitor 23 of the bypass circuit 21, and the potential difference between the AC side and the DC side may be reduced by a voltage $V_C$ of the capacitor 8 of each of the SMs and a voltage $V_{C3}$ of the capacitor 23 of the bypass circuit 21. Accordingly, the fault current may eventually converge to zero.

Also, since the discharge of the voltages $V_C$ and $V_{C3}$ can be prevented, the SM of multi-level converter 20 may be quickly rebooted after the removal of a fault current.

Referring to FIG. 15, in a case when a fault current flows, the switching device 34, which is added between the SMs, is turned off. Accordingly, a current flows through the diode 32 of the bypass circuit 31, but not through the switching device 34 and the diode 35 connected in parallel to the switching device 34. That is, since the switching device 34 is turned off, a bypass path to the bypass circuit 31 is secured for a fault current, and a fault current may be allowed to flow to the diode 32 and the capacitor 33. A potential difference between an AC side and a DC side may be eliminated not only by the capacitor 8 of each of the SMs, but also by the capacitor 33 of the bypass circuit 31. Accordingly, a fault current may be reduced to zero.

For example, a fault current may flow through the capacitor 8 of each of the SMs and the capacitor 33 of the bypass circuit 31, and the potential difference between the AC side and the DC side may be reduced by voltages $V_{C1}$ and $V_{C2}$ of the capacitors 8 of the SMs and a voltage $V_{C3}$ of the capacitor 33 of the bypass circuit 31. Accordingly, the fault current may eventually converge to zero. Also, since the discharge of the voltages $V_{C1}$, $V_{C1}$ and $V_{C3}$ can be prevented, the part of multi-level converter 30 may be quickly rebooted after the removal of a fault current.

For a reduction of a fault current, the aforementioned full- or half-bridge-type fault current reduction structure or a combination thereof may be appropriately used, and accordingly, the number of full- or half-bridge connections between the elements thereof may be reduced.

FIG. 16 is a diagram illustrating a modular multi-level converter according to an exemplary embodiment of the invention.

Referring to FIG. 16, a modular multi-level converter 40 has almost the same structure as the multi-level converter 1 of FIG. 1 except that it further includes a fault current reduction module 41 in each converter arm thereof. More specifically, in each converter arm of the modular multi-level converter 40, a fault current reduction module 41 may be additionally provided as a protection circuit for protecting a plurality of SMs 5 and may be connected in series to the SMs 5.

The fault current reduction module 41 provides a path via which a current can smoothly flow in a case when the current flows from a DC side to an AC side or vice versa in the modular multi-level converter 40.

However, in response to the occurrence of a DC fault, the fault current reduction module 41 turns off a switch thereof so as to prevent a current from flowing to the SMs 5. Since the path of flow of a current varies depending on whether the switch of the fault current reduction module 41 is on or off, the fault current reduction module 41 may protect the multi-level converter 40 from a fault current. FIG. 17 is a diagram illustrating a fault current reduction module of a modular multi-level converter, according to an exemplary embodiment of the invention.

Referring to FIG. 17, a fault current reduction module 41 may be connected in series to SM. The SMs may be of a full-bridge type or a half-bridge type.

The fault current reduction module 41 may include a normal circuit having a switching device 44 and a bypass circuit 47 having a capacitor 43.

More specifically, the fault current reduction module 41 includes the bypass circuit 47, which is connected in series to the SMs to bypass a fault current generated in a converter arm.

The bypass circuit 47 includes a diode 42 and a capacitor 43, and the diode 42 is connected in series to the capacitor 43.

The capacitor 43 stores and absorbs a fault current therein and thus protects the SMs from the fault current.

The diode 42 installed in the bypass circuit 47 provides a bypass path for a fault current so that the capacitor 43 can be charged with a fault current. In response to the capacitor 43 being charged, a potential difference between an AC side and a DC side may be reduced, and as a result, a fault current may converge to zero.

The capacitor 43 installed in the bypass circuit 47 may be charged in advance, in which case, the amount of time that it takes to reduce a fault current decreases.

The fault current reduction module 41 may also include the switching device 44, which is connected in parallel to the bypass circuit 47 to block a fault current, and a diode 45, which is connected in parallel to the switching device 44.

For example, in a case when a normal current flows, the switching device 44 is turned on, the switching device 44 is turned on, and thus, a current path is formed along each of the SMs. In a case when a fault current flows, the switching device 44 is turned off, and thus, a current path to the bypass circuit 47 is formed.

The switching device 44 may be an IGBT, but the invention is not limited thereto. That is, the switching device 44 may be a switching device other than an IGBT.

For example, the switching device 44 may be a fast switch. Alternatively, the switching device 44 may be a thyristor. Still alternatively, the switching device 44 may include a plurality of IGBTs.

The diode 42 and the capacitor 43 installed in the bypass circuit 47 absorb a fault current so as for the fault current to become nearly zero. Accordingly, a capacitor with sufficient capacitance to absorb a fault current needs to be installed in the bypass circuit 47.

Due to the fault current reduction module 41, damage to the SMs can be prevented even in the case of the occurrence of a DC fault.

In a modular multi-level converter not having the fault current reduction module 41, an excessive current continues to flow in response to the occurrence of a DC fault. As a result, each converter arm of the modular multi-level converter may all be damaged, requiring replacement of the entire modular multi-level converter.

On the other hand, in the exemplary embodiment of FIGS. 16 and 17, a fault current reduction module 41 is connected to a plurality of SMs of the modular multi-level converter 40, thereby lowering the cost of handling a DC fault that may occur in the modular multi-level converter 40.

FIG. 18 is a diagram illustrating a converter arm in which a plurality of fault current reduction modules according to the exemplary embodiment of FIG. 17 are connected in series.

Referring to FIG. 18, two fault current reduction modules 41 are connected in series in a converter arm of a modular multi-level converter.

The fault current reduction modules 41 may be connected to the AC side of the converter arm and may thus prevent a DC fault from being caused by the DC sides of upper and lower converter arms being grounded.

More specifically, the larger the difference between the voltages of two sides, the higher the current flowing between the two sides. If the DC sides of the upper and lower converter arms on are grounded while a voltage continues to be formed and output from the AC sides of the upper and lower converter arms, a voltage at the DC sides of the upper and lower converter arms may become zero, and a difference may be generated between the voltage at the AC sides of the upper and lower converter arms and the voltage at the DC sides of the upper and lower converter arms. As a result, an excessive current may flow.

Also, a freewheeling current path may be formed due to a voltage generated by SMs that are turned on in each of the upper and lower converter arms, and as a result, an excessive current may flow.

In the exemplary embodiment of FIGS. 16 and 17, in a case when an excessively high current flows as in the event of a DC fault, the fault current reduction module 41, and particularly, the capacitor 43 of the fault current reduction module 41, may absorb the current at the front or the rear of each converter arm of the modular multi-level converter 40. Accordingly, a capacitor 43 with sufficient capacitance to absorb a fault current needs to be provided in the fault current reduction module 41, and may differ from a capacitor 8 in each of the SMs 5.

A current path in a modular multi-level converter in a case when a normal current flows in the modular multi-level converter will hereinafter be described.

FIGS. 19 and 20 are diagrams illustrating the flow of a normal current in a modular multi-level converter having a plurality of fault current reduction modules installed in each converter arm thereof.

More specifically, FIG. 19 illustrates the flow of a current from an AC side to a DC side in a modular multi-level converter having a plurality of fault current reduction modules 41 installed in each converter arm thereof, and FIG. 20 illustrates the flow of a current from the DC side to the AC side in the modular multi-level converter having the fault current reduction modules 41 installed in each converter arm thereof.

Referring to FIGS. 19 and 20, in a case when a normal current flows, a switching device 44 of each of the fault current reduction modules 41 is turned on. Accordingly, a current does not flow to a diode 42 and a capacitor 43 of a bypass circuit 47 of each of the fault current reduction modules 41, but flows to the switching device 44.

Referring to FIG. 19, a DC voltage may be transformed in a stepwise manner into an AC voltage according to the number of switching devices or IGBTs 6 that are turned on in each of a plurality of SMs. In response to there being three SMs 5 connected in series, as illustrated in FIG. 19, four AC voltage branches may be formed. The IGBTs 6 of the SMs are switched from an "on" state to an "off" state according to voltage instructions from the AC side, and as a result, a DC voltage may be transformed into an AC voltage.

For example, as illustrated in FIG. 19, two SMs from the top of a converter arm may be switched on, and one SM below the two SMs may be switched off.

In this example, a voltage from only two capacitors 8 may be generated as an upper arm voltage. The SMs may be switched on or off by an arm controller according to an AC voltage to be generated. The number of SMs that are turned on may be uniform from an upper converter arm to a lower converter arm of a single leg. Accordingly, a uniform DC voltage may be generated.

Referring to FIG. 20, in a case when a current flows from the DC side to the AC side, a current does not flow to the bypass circuit 47 of each of the fault current reduction modules 41, but flows to a diode 45 of each of the fault current reduction modules 41, which is connected in parallel to the switching device 44 of a corresponding fault current reduction module 41.

In a case when a current flows from the DC side to the AC side, as illustrated in FIG. 20, the state of each of the SMs is determined by a lower switch 6 thereof. The SMs do not generate a capacitor voltage and are switched off in response to their respective lower switches 6 being turned on. In the example of FIG. 20, three SMs may be switched on. Accordingly, a voltage from three capacitors 8 may be generated as an upper arm voltage.

The SMs may be switched on or off by the arm controller according to an AC voltage to be generated.

As illustrated in FIG. 20, a current flows from the DC side to the diodes 45 of the fault current reduction modules 41 and then to the AC side. However, no current can flow along a bypass path because of the resistance of the diodes 42 of the fault current reduction modules 41.

A current path in a modular multi-level converter in a case when a fault current flows will hereinafter be described.

FIG. 21 is a diagram illustrating the flow of a fault current in a modular multi-level converter having a plurality of fault current reduction modules installed in each converter arm thereof. Referring to FIG. 21, in response to the occurrence of a DC fault, an excessive current may flow through each converter arm having a plurality of fault current reduction circuits 41 and a plurality of SMs in a bottom-to-top direction.

A fault current reduction structure including an excessive current detector may be provided and may perform a protection operation according to a signal provided by the excessive current detector. The excessive current detector may be installed not only in the fault current reduction structure, but also at either end of the SMs 5. When installed at either end of the SMs 5, the fault current reduction structure may turn off the switches of the fault current reduction structure 41 as a protection operation upon the detection of a fault current.

The protection operation may be performed according to excessive current. The protection operation may also be performed according to a signal generated by a control unit of the modular multi-level converter.

The protection operation includes turning off all the switching devices of the modular multi-level converter, i.e., switching devices 6 of each of the SMs and a switching device 44 of each of the fault current reduction modules 41. By turning off all the switching devices of the modular multi-level converter, a bypass path may be formed.

Capacitors 43 on the bypass path absorb an excessive current. Diodes 42 connected at the rear of the capacitors 43 allow a current to flow in one direction. Since the capacitors 43 on the bypass path absorb an excessive current, the excessive current does not flow to the switching devices 6 and diodes 7 of each of the SMs.

FIG. 22 is a diagram illustrating a fault current reduction module according to another exemplary embodiment of the invention.

Referring to FIG. 22, a fault current reduction module 41 forms a bypass path with a single capacitor 43 and a single diode 42.

In the fault current reduction module 41 of FIG. 22, a capacitor 43 having a different capacitance from the capacitor 43 of FIG. 17 may be used.

In the exemplary embodiment of FIG. 17, two fault current reduction modules 41 connected in series may be used.

Accordingly, improved expandability and facilitated maintenance and replacement of parts and elements can be guaranteed, as compared to the exemplary embodiment of FIG. 17. On the contrary, in the exemplary embodiment of FIG. 22, the entire fault current reduction module 41 needs to be replaced if the capacitor 43 is broken.

The fault current reduction module 41 is illustrated in FIG. 22 as being disposed on an AC side of a modular multi-level converter 1, but the invention is not limited thereto. Since a current is basically a type of flow, the position of the fault current reduction module 41 in the modular multi-level converter 1 is not particularly limited. However, if the fault current reduction module 41 is connected in series to the modular multi-level converter 1, the fault current reduction module 41 may effectively absorb an excessive current may thus prevent the occurrence of a fault.

Referring to FIG. 22, the capacitor 43 of the fault current reduction module 41 may be arranged such that its electrodes are aligned in opposite directions to the electrodes of each of a plurality of capacitors 8 of the modular multi-level converter 1.

In the exemplary embodiment of FIG. 22, a switching device 44 of the fault current reduction module 41 may be always turned on, whereas a plurality of switching devices 7 of the modular multi-level converter 1 are turned on or off under the control of a control unit.

FIG. 23 is a diagram illustrating the flow of a current from a DC side to an AC side.

Referring to FIG. 23, a current from the modular multi-level converter 1 may flow to the diode 45 of the fault current reduction module 41 and then to the AC side of the modular multi-level converter 1. On the other hand, a current does not flow to the bypass path of the fault current reduction module 41 because of the resistance of the diode 42.

FIG. 24 is a diagram illustrating the flow of a fault current.

Referring to FIG. 24, in response to a fault current being generated, a potential difference between the AC side and the DC side increases. An excessive current from the AC side may flow through the switching device 44 of the fault current reduction module 41, and as a result, the switching device 44 may be turned off due to the excessive current. The switching device 44 with the excessive current flown therethrough may need to be replaced. The switching device 44 may be turned off according to a signal provided by an excessive current detector, a system controller or an arm controller.

In response to the switching device 44 being turned off by an excessive current, the excessive current may flow to a bypass circuit of the fault current reduction module 41. Since the bypass circuit 47 includes the capacitor 43, the bypass circuit 47 may perform the functions of a buffer by absorbing the excessive current. The capacitor 43 absorbs, and is charged with the excessive current, and as a result, a voltage $V_C$ of the capacitor 43 increases. As the voltage $V_C$ of the capacitor 43 increases, the potential difference between the AC side and the DC side decreases, and as a result, a fault current is reduced.

The capacitor 43 of the fault current reduction module 41 may have sufficient capacitance to completely absorb a fault current. If the capacitance of the capacitor 43 is large enough to absorb a DC fault current, no current may flow to the modular multi-level converter 1 any longer.

For a reduction of a fault current, the aforementioned full- or half-bridge-type fault current reduction structure or a combination thereof may be appropriately used, and accordingly, the number of full- or half-bridge connections between the elements thereof may be reduced.

FIG. 25 is a block diagram illustrating a fault current reduction apparatus of a multi-level converter, according to an exemplary embodiment of the invention.

Referring to FIG. 25, a fault current reduction apparatus 2500 includes a multi-level converter 2510, a fault current sensing unit 2520 and a control unit 2530.

FIG. 25 illustrates only the elements of the fault current reduction apparatus 2500 that are relevant to the invention, and it is obvious that the fault current reduction apparatus 2500 may also include elements other than those set forth in FIG. 25.

The multi-level converter 2510 may include more than one converter arm in which a plurality of SMs are connected in series. The multi-level converter 2510 may include a bypass circuit, which provides a bypass path for a fault current in each converter arm and may also include a switching device, a diode and a capacitor to bypass a fault current.

The structure of the multi-level converter 2510 has already been described above with reference to FIGS. 4 to 24, and thus, a detailed description thereof will be omitted.

The fault current sensing unit 2520 may sense a fault current generated in the multi-level converter 2510, and a current sensor may be used as the fault current sensing unit 2520.

The control unit 2530 may control the switching device of the multi-level converter 2510 upon the detection of a fault current so as for the fault current to flow to the bypass circuit of the multi-level converter 2510. That is, the control unit 2530 may control a fault current to flow along the bypass circuit of the multi-level converter 2510 without passing through IGBTs of the multi-level converter 1100 and may thus protect the multi-level converter 2510 from the fault current.

According to the exemplary embodiments of the invention, a fault current in a multi-level converter may be reduced, thereby increasing the lifetime of the multi-level converter. Techniques for reducing a fault current, according to the exemplary embodiments of the invention may be used in connection with offshore wind power projects, and are expected to be of greater importance with an ever-increasing demand for high-capacitance converters such as medium- or large-scale high voltage direct current (HVDC) transmission systems or multi-terminal HVDC transmission systems.

While the invention has been particularly shown and described with reference to exemplary embodiments thereof, it will be understood by those of ordinary skill in the art that various changes in provide and detail may be made therein without departing from the spirit and scope of the invention as defined by the following claims. The exemplary embodiments should be considered in a descriptive sense only and not for purposes of limitation.

What is claimed is:

1. A multi-level converter having more than one converter arm in which a plurality of sub-modules are connected in series, the multi-level converter comprising:
    a first bypass circuit connected in parallel to at least one sub-module included in the more than one converter arm on a first side and including a first switching device and a diode;
    a second bypass circuit connected in parallel to the more than one converter arm on a second side and including a diode;
    a second switching device included in the more than one converter arm and having a first end connected in series to the at least one sub-module and a second end connected to a first end of the first bypass circuit at a single node; and
    a third switching device included in the more than one converter arm and having a first end connected in series to the at least one sub-module and a second end connected to a first end of the second bypass circuit at a single node,
    wherein in response to the detection of a fault current, the first switching device is short-circuited and the second switching device and the third switching device are opened,
    wherein the sub-modules and the first bypass circuit include capacitors, and the capacitance of the capacitor of the first bypass circuit is greater than the capacitance of the capacitor of the sub-module, and
    wherein the diode installed in the first bypass circuit may allow a current to flow in an opposite direction to the diode of sub-module.

2. A multi-level converter having more than one converter arm in which a plurality of sub-modules are connected in series, the multi-level converter comprising:
    a fault current reduction module connected in series to the more than one converter arm,
    wherein the fault current reduction module includes a bypass circuit, which is connected in series to the sub-modules, and a switching device, which is connected in parallel to the bypass circuit, and the bypass circuit includes a capacitor and a diode, which is connected in series to the capacitor,
    wherein the diode is connected such that a forward direction thereof can be aligned with a direction of the flow of a fault current,
    wherein in response to the detection of a fault current, the switching device is opened,
    wherein the sub-modules include a capacitor, and the capacitance of the capacitor of the first bypass circuit is greater than the capacitance of the capacitor of the sub-module, and
    wherein the diode installed in the first bypass circuit may allow a current to flow in an opposite direction to the diode of sub-module.

3. The multi-level converter of claim 2, wherein the fault current reduction module further includes a diode, which is connected in parallel to the switching device.

4. A fault current reduction apparatus of a multi-level converter, comprising:
    a fault current sensing unit sensing a fault current;
    the multi-level converter including more than one converter arm in which a plurality of sub-modules are connected in series and further including a first bypass circuit, which is connected in parallel to at least one sub-module included in the more than one converter arm on a first side and includes a first switching device, a second bypass circuit, which is connected in parallel to the more than one converter arm on a second side and includes a diode, a second switching device, which is included in the more than one converter arm and has a first end connected in series to the at least one sub-module and a second end connected to a first end of the first bypass circuit at a single node, and a third switching device, which is included in the more than one converter arm and having a first end connected in series to the at least one sub-module and a second end connected to a first end of the second bypass circuit at a single node; and a control unit short-circuiting the first switching device upon the detection of the fault current and opening the second switching device and the third switching device, wherein in response to the detection of a fault current, the first switching device is short-circuited and the second switching device and the third switching device are opened, and wherein the sub-modules and the first bypass circuit include capacitors, and the capacitance of the capacitor of the first bypass circuit is greater than the capacitance of the capacitor of the sub-module, and wherein the diode installed in the first bypass circuit may allow a current to flow in an opposite direction to the diode of sub-module.

5. The fault current reduction apparatus of claim 4, wherein the first, second and third switching devices are short-circuited or opened according to a control signal applied by the control unit.

6. A fault current reduction apparatus of a multi-level converter, comprising:

a fault current sensing unit sensing a fault current;

the multi-level converter including more than one converter arm in which a plurality of sub-modules are connected in series and further including a fault current reduction module connected in series to the more than one converter aim, wherein the fault current reduction module includes a bypass circuit, which is connected in series to the sub-modules, and a switching device, which is connected in parallel to the bypass circuit, and the bypass circuit includes a capacitor and a diode, which is connected in series to the capacitor; and a control unit controlling the fault current to flow to the bypass circuit in response to the detection of the fault current, wherein the diode is connected such that a forward direction thereof can be aligned with a direction of the flow of a fault current, wherein the control unit opens the switching device in response to the detection of the fault current, wherein the sub-modules include a capacitor, and the capacitance of the capacitor of the first bypass circuit is greater than the capacitance of the capacitor of the sub-module, where in the diode installed in the first bypass circuit may allow a current to flow in an opposite direction to the diode of sub-module.

* * * * *